United States Patent [19]
Hefter et al.

[11] 3,948,571
[45] Apr. 6, 1976

[54] VALVE FOR CONTROLLING PRESSURE MEDIUM ACTUATED BRAKES FOR RAILWAY AND OTHER VEHICLES

[75] Inventors: Erik Hefter, Germering; Hans Pöllinger, Munich, both of Germany

[73] Assignee: Knorr-Bremse GmbH, Munich, Germany

[22] Filed: Nov. 7, 1974

[21] Appl. No.: 521,910

[30] Foreign Application Priority Data
Nov. 7, 1973  Germany............................ 2355541

[52] U.S. Cl................................ 303/22 R; 303/15
[51] Int. Cl.²....................... B60T 8/18; B60T 15/04
[58] Field of Search ......... 303/22 R, 22 A, 2, 3, 15, 303/18, 57, 59; 188/195

[56] References Cited
UNITED STATES PATENTS

| | | | |
|---|---|---|---|
| 3,068,050 | 12/1962 | Pekrul............................ | 303/22 R X |
| 3,228,731 | 1/1966 | Valentine....................... | 303/22 R X |
| 3,517,971 | 6/1970 | Scott.............................. | 303/22 A |
| 3,685,868 | 8/1972 | Nagase et al.................. | 303/22 R |
| 3,761,142 | 9/1973 | Williams et al................. | 303/22 R |
| 3,799,623 | 3/1974 | Wickham et al................ | 303/15 X |
| 3,823,984 | 7/1974 | Parfitt et al.................... | 303/3 |

FOREIGN PATENTS OR APPLICATIONS

| | | | |
|---|---|---|---|
| 254,114 | 2/1963 | Australia........................ | 303/22 R |
| 1,234,381 | 10/1960 | France........................... | 303/15 |
| 436,375 | 10/1926 | Germany........................ | 303/22 R |
| 444,802 | 2/1949 | Italy............................... | 303/22 R |
| 948,551 | 8/1949 | France........................... | 303/22 R |
| 800,683 | 11/1950 | Germany........................ | 303/22 R |

Primary Examiner—Trygve M. Blix
Assistant Examiner—Douglas C. Butler
Attorney, Agent, or Firm—Edmund M. Jaskiewicz

[57] ABSTRACT

A valve device for controlling pressure medium actuated brakes, particularly for railway vehicles, comprises a multi-stage valve to set one of a plurality of pressure stages. The valve has an axially displaceable stepped piston having a plurality of annular radial surfaces with a predetermined surface area ratio to each other. The surfaces are subjected to the action of pressure medium through control valves separately or in combination in accordance with a selected pressure stage. The piston controls a double valve connected between a source of pressure medium and the brake which is supplied with pressure medium or vented in response to position of the double valve. The radial surfaces of the piston are subjected to a selected stage pressure against a constant force that is independent of the control pressure such that this axially applied force is in balance with the force exerted by the pressure of the pressure medium against the radial surfaces at every braking stage.

5 Claims, 5 Drawing Figures

3,948,571

VALVE FOR CONTROLLING PRESSURE MEDIUM ACTUATED BRAKES FOR RAILWAY AND OTHER VEHICLES

BACKGROUND OF THE INVENTION

The present invention relates to a valve device for controlling pressure actuated brakes for railway and other vehicles wherein a multi-stage valve is used to set one of a plurality of pressure stages, more particularly to the maintaining of the pressure applied to the brake at each braking stage within precise predetermined standards.

It is known to control pressure medium actuated brakes, particularly in railway vehicles, by using a multi-stage valve in which is slidably mounted an axially displaceable stepped piston having a plurality of annular radial surfaces with a predetermined surface ratio to each other. These surfaces can be subjected to the action of pressure medium through control valves separately or in combination in accordance with a predetermined pressure stage. The piston controls a double valve connected between a source of pressure medium and the brake which is supplied with pressure medium or vented in response to the position of the double valve.

German patent 718 414 discloses a device for controlling the brakes of railway vehicles wherein distribution elements for regulating the operating medium are arranged on the different cars. A multi-stage brake regulating switch is employed which has a number of brake positions corrresponding to the number of braking stages and which is provided with a number of driving elements correspondng to such braking positions. The elements are electrically controlled. In response to the electrical setting of such driving means, the distribution element is shifted into the setting which corresponds to the specific setting of the brake regulating valve.

British patent 903 600 discloses an automatic multi-stage valve which when open will permit the brake cylinder to become filled with a pressure medium until the valve is closed in response to a reaction from the filled brake cylinder. The valve is thus closed and the brake is maintained in the release position by means of a unilaterally open tube which forms the axis of the displaceable control valve. The position of the brake can be varied by stages that are established by the control valve. Such known devices generally employ multi-stage or graduated valves that have a constant pressure stage level. This means that the same brake force is effective at every pressure or braking stage. As a result, the percentage deviation in the separate pressure stages is different which may lead to an undesirable shaking and shifting in the separate cars. If it is desired to apply the braking force in response to the load of the vehicles, then special structure such as valves and accessories thereto must be connected to the multi-step valve. The result is a complex and expensive braking system.

SUMMARY OF THE INVENTION

It is therefore the principal object of the present invention to provide a novel and improved control valve of the type disclosed herein.

It is another object of the present invention to provide such a valve device wherein the actual braking effect differs from the required braking effect by only a small percentage and this small percentage is the same at every braking stage.

A further object is to provide such a control device wherein the minimum required braking is about 30% of the maximum required braking so that a rapid braking of a train of railway vehicles can occur.

It is an additional object of the present invention to provide such a control valve wherein the braking force is loaddependent by means of a simple and reliable structure which does not require expensive and complex additional components.

According to one aspect of the present invention a control valve for a pressure medium actuated brakes for railway and other vehicles may comprise a multi-stage axially displaceable piston valve member having a plurality of annular radial surfaces thereon. The surfaces have a predetermined surface area ratio to one another. A plurality of control valves are separately operable to subject the radial surfaces individually or in combination to a pressure medium in response to a selected pressure or braking stage. A double valve is connected between a supply of pressure medium and a brake and is operable by the piston valve member so that the pressure medium at the brake is supplied or evacuated in response to the position of the double valve. A constant axial force is applied against the piston valve member and this force is independent of the control pressure but in opposition to the force exerted by the pressure medium against the piston valve member radial surfaces. The axially applied force and the force exerted by the pressure medium on the radial surfaces are constant and balance each other at all stages of braking. The axial force may be applied by a spring or by a fluid pressure actuated cylinder.

It is to be understood that the invention is not limited to compressed air brakes but may be used with other pressure media such as liquids and particularly oil. In addition, the present invention is not limited to the use of remote control regulation valves in the form of solenoid valves. It is possible to use other electrically or pressure medium actuated control valves.

Other objects and advantages of the present invention will be apparent upon reference to the accompanying description when taken in conjunction with the drawings, which are exemplary.

DESCRIPTION OF THE PREFERRED EMBODMENT

Proceeding next to the drawings wherein like reference symbols indicate the same parts throughout the various views a specific embodiment and modifications of the present invention will be described in detail.

Figure 1:
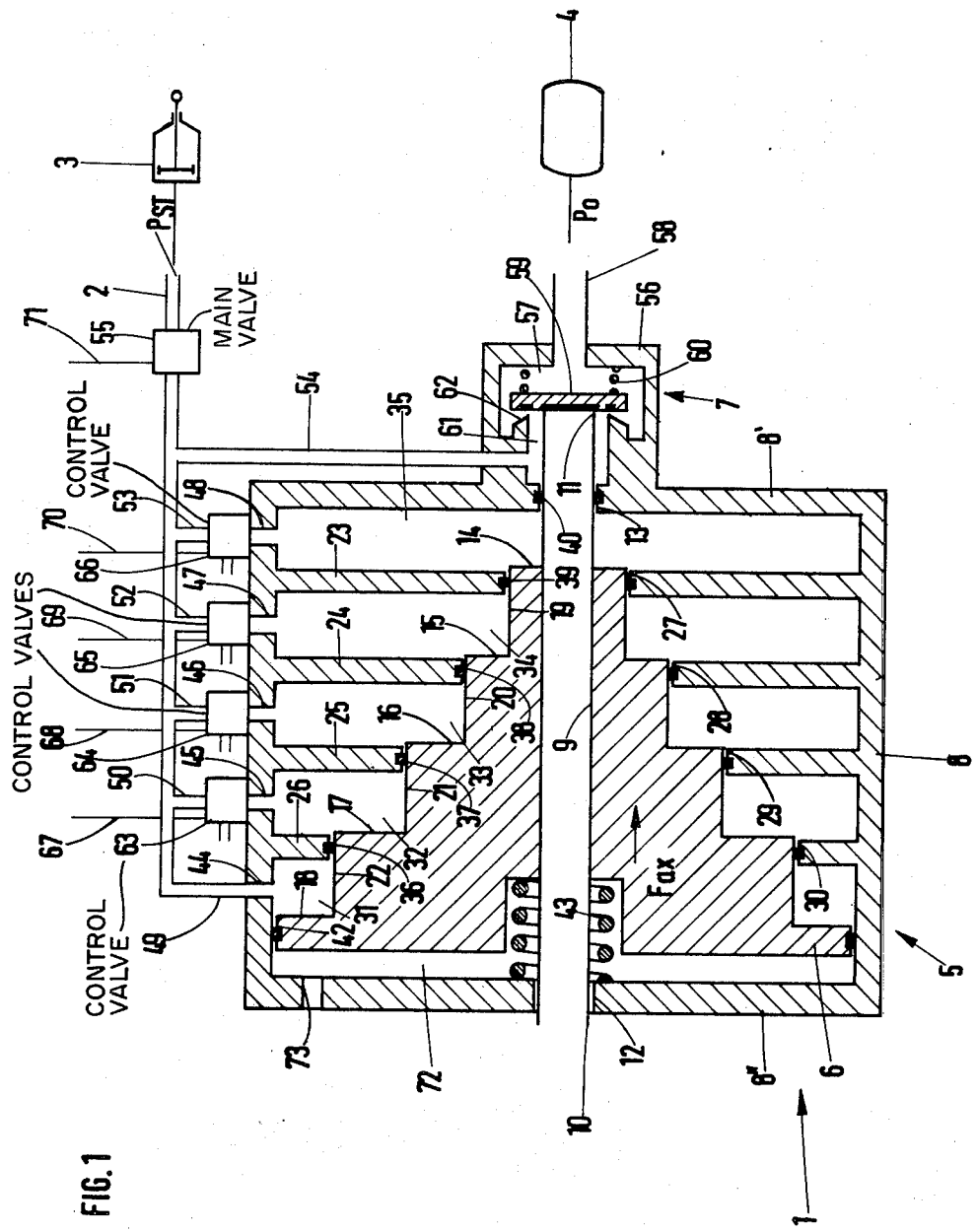
FIG. 1 is a longitudinal sectional view of a control valve according to the present invention.

In FIG. 1 there is indicated generally at 1 a digitally controlled valve device which is connected in a brake line 2 leading between a brake cylinder 3 and a reservoir 4, a source of pressure medium, in order to control the braking force on the vehicle. The valve device 1 includes a multi-stage or graduated valve 5 having a stepped piston 6 and a double valve 7 which in this particular embodiment forms a unit with the valve 5.

The multi-stage valve 5 has a cylindrical housing 8 within which the piston 6 is slidably mounted for axial displacement therein. Piston 6 is provided with a coaxial tube 9 which is securely attached to the piston and has ends 10 and 11 slidably mounted in axial openings 12 and 13 in the end walls 8'' and 8' of the cylindrical housing 8.

The stepped piston 6 has a number of stages that are formed by several concentric annularly-shaped radial surfaces 14–18 which are interconnected by axially extending cylindrical surfaces 19–22. The cylindrical surface 19 is defined by the smallest radial surface 14 and the next to the smallest radial surface 15. In a similar manner, the next successive cylindrical surface 20 is defined by radial surface 15 and succeeding radial surface 16. The cylindrical surfaces 21 and 22 are correspondingly defined by the respective radial surfaces 16,17 and 17,18.

On the inner surface of the cylindrical housing wall 8 there are a number of inwardly projecting radial partitions 23–26 that succeed one another corresponding with the selected axial stage level of the individual stages of the stepped piston 6. Partitions 23–26 have cylindrical openings 27–30 therein whose axes coincide with the central longitudinal axis of housing 8 which also coincides with the central longitudinal axis of the piston 6. The diameters of openings 27–30 correspond to the diameters of the cylindrical sections of the stepped piston 6 formed by cylindrical surfaces 19–22 such that cylindrical surface 19 fits with only a small clearance in opening 27 of partition 23 and successive cylindrical surfaces 20–21 and 22 fit with a correspondingly small clearance in the corresponding openings 28,29 and 30 of partitions 24,25 and 26.

The partitions 23–26 together with the radial surfaces 15–18 and the cylindrical surfaces 19–22 of piston 6 as well as the opposite surface areas on the inner side of housing wall 8 define a plurality of separate annular chambers 31–34. A further chamber 35 is defined by annular surface 14, partition 23 end wall 8' of the housing 8 and the inner surface of the housing wall 8. The chambers 31 through 35 are tightly and sealingly separated from each other with respect to the pressure medium employed by means of a plurality of packings 36–39 positioned between the annular faces of the partitions 23–26 and cylindrical surfaces 19–22. A packing 40 is also included between the tube 9 and housing opening 13 and a packing 42 is positioned between the inner cylindrical wall of housing 8 and the cylindrical peripheral surface at the larger diameter end of the stepped piston 6.

The ratio of the surface areas of the radial surfaces 14, 15,16 and 17 are 1:2:4:8. The additional largest radial surface 18 need not fit within this step ratio of areas.

A spring 43 is positioned between end wall 8'' of housing 8 and a surface on step piston 9 opposed to the radial surfaces 14–18. The spring 43 constantly urges the piston 6 to the right as viewed in FIG. 1 with a force $F_{ax}$. The force exerted by the spring 43 can be adjusted. Instead of the spring 43, a fluid actuated piston and cylinder can be employed. The piston is connected to the piston pipe 9 and is displaceable within the cylinder which is subjected to the control pressure.

The cylindrical wall 8 of the housing has a plurality of openings 44–48 therein which lead to chambers 31–35, respectively. The openings 44–48 communicate through pipe connections 49–53 with a pressure medium pipe 54 that is connected to the brake line 2 through a main valve 55. On the outer surface of the housing end wall 8'' there is mounted the double valve 7 which comprises a valve housing 56 within which is a chamber 57 that is connected to the reservoir 4 through a pipe connection 58. Within the chamber 57 is an axially displaceable plate valve member 59 which is loaded by a spring 60 in the direction toward end 11 of tube 9. The spring 60 bears against an inner wall surface of the valve chamber 57. The valve housing 56 has a central opening 61 around which is a valve seat 62 for the plate valve member 59. When the valve member 59 is seated upon the valve seat 62 pressure is shut off from the pressure medium pipe 54 (connected to the double valve 7) from chamber 57 and thus from the reservoir 4. End 11 of the tube 9 projects into the central opening 61 and forms a second valve seat of the double valve 7. When the stepped piston 6 is shifted toward valve plate 59, the plate is lifted from its seat 62 against the force of spring 60. Accordingly, the pipe 54 is connected to the valve chamber 57 and the pressure medium is supplied from reservoir 4 into pipe 54. When the piston 6 is shifted axially to the left as viewed in FIG. 1, the valve plate 59 will be tightly seated upon the valve seat 62 and the pipe end 11 will be disengaged from the valve plate 59. This will cut off the flow path between reservoir 4 and the pipe 54 so that the pipe 54 is now connected to the piston pipe 9 whose other end 10 is open to the atmosphere or at zero pressure so that the pressure medium is able to flow through pipe 9 from pipe 54 and the connected pipes.

The parallel pipe connections 50–53 leading to chambers 32–35 within the multi-stage valve 5 contain additional control valves 63–66 respectively. In their open positions, these control valves connect the respective chambers 31–35 to the pipe 54 and in their closed positions disconnect pipe 54 from these chambers to simultaneously vent the chambers.

The main valve 55 and the control valves 63–66 are preferably solenoid valves that can be operated individually through an electrical control circuit having leads 67–71 connected thereto respectively. The connecting pipe 49 has no valve so that the chamber 31 is always subjected to the pressure of the pressure medium which is present in pipe 54. On the other hand, the chambers 32–35 are supplied with the pressure medium, compressed air or vented, separately or in combination in accordance with the selected positions of the control valve 63–66. The valves 55 and 63–66 may also be pressure medium actuated valves. In order to relieve pressure in a chamber 72 between the large surface end of step piston 6 and the inner side of end wall 8'' of the housing a bore 73 is in the end wall 8''.

The operation of the valve device of the present invention as described above will now be explained in detail with reference to the graph of FIG. 2.

Figure 2:
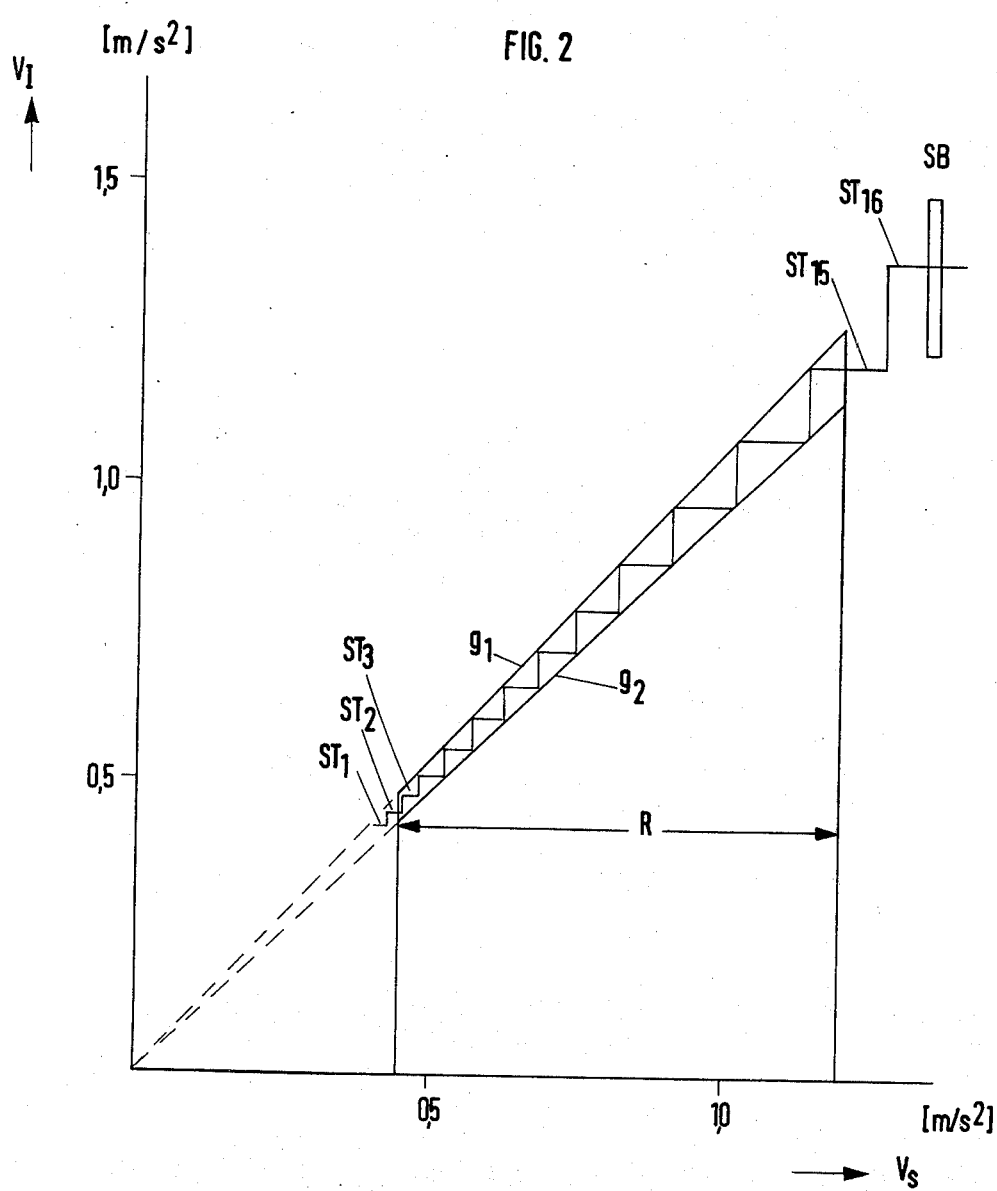
FIG. 2 is a graph which is explanatory of the operation of the valve of FIG. 1.

In FIG. 2 the actual braking or deceleration $V_I$ in m/sec$^2$ is plotted as a function of the required braking or deceleration $V_s$ in m/sec$^2$.

Utilizing the stepped pistion 6 of FIG. 1 which has the five radial surfaces, 16 different pressure stages or braking stages may be set with the control device by a suitable actuation of valves 63–66 and these pressure stages are shown in FIG. 2. The individual pressure stages are designated as $ST_1, ST_2, ST_3 \ldots ST_{15}$ and $ST_{16}$, of which the lowest three pressure stages and the two highest pressure stages are provided with the corresponding reference symbols. Except for the last pressure stage $ST_{16}$ all of the pressure stages are located between tolerance limits that are defined by the straight lines $g_1$ and $g_2$ intersecting at the 0 point of the graph.

The valve device 1 of the subject invention is so arranged in this particular embodiment that pressure steps $ST_3$ to $ST_{15}$ within a predetermined control range R are located between a minimum required deceleration of 0.45 m/sec² and a maximum required deceleration of 1.2 m/sec². The fact that the two lowest pressure steps $ST_1$ and $ST_2$ are located outside of the control range R permits the minimum required deceleration to be obtained. Pressure step or stage $ST_{15}$ intersects the upper boundary of the control range for the maximum required deceleration approximately at its center which thus meets the requirements that are established.

In the valve device of the present invention the level of the last pressure stage $ST_{16}$ may be advantageously selected independently of the selected tolerance limits so that this last pressure stage is particularly suitable as a rapid braking stage. Because of the fact that brake stages $ST_1$ to $ST_{15}$ extend within the selected tolerance range between straight lines $g_1$ and $g_2$ the percentage deviations of the actual deceleration from the required deceleration are approximately equal from step to step through the different braking stages.

The constant axial force $F_{ax}$ of a predetermined magnitude acting on the piston 6 and applied by the spring 43 as shown in FIG. 1 is opposed by a variable axial force acting on the piston that is a function of the specific pressure stage $P_{ST}$ in brake cylinder 3 and the position of the control valves 63–66 that are opened or closed in accordance with the selected braking step. When these axial forces acting upon the piston are not in equilibrium there will be an axial displacement of the piston 6 which will bring about either an additional supply of pressure medium $P_o$ into the brake cylinder 3 through opened double valve 7 into pipe 54 or venting of the brake cylinder 3 through pipe 54 and the piston pipe 9 which is lifted from the valve plate 59. When these opposed axial forces acting upon the piston are in equilibrium, the double valve 7 is closed which means that the valve member plate 59 is seated on valve seat 62 and open end 11 of piston pipe 9 is in contact with the valve plate 59.

Thus, in this state of equilibrium the stage pressure will be as follows:

$$P_{ST} \cdot (A_o + n \cdot A_1) = F_{ax} = \text{constant}$$

in which $n$ is an integer 0 . . . 15, $A_o$ is the surface area of the annular surface 18 which is continuously subjected to stage pressure $P_{ST}$ and the remaining radial surfaces 14, 15, 16 and 17 having the surface area relationship of 1:2:4:8 have the corresponding surface values $A_1$, $2A_1$, $4A_1$ and $8A_1$.

As a result, the lowest braking step $ST_1$ may be designated as follows:

$$P_{ST} \text{ Min} = \frac{F_{ax}}{A_o + 15 A_1}$$

At the lowest braking stage $ST_1$ each of the four control valves 63–66 are opened and thus each of the five chambers 31–35 is supplied with air under pressure.

As an increased braking effect is desired or required, the total surface of the piston 6 which is subjected to the action of $P_{ST}$ is reduced in constant steps from the area $A_1$ (area of radial surface 14). Thus, the effective braking pressure as applied by the brake cylinder 3 is increased in steps with increasing step level as illustrated in the diagram of FIG. 2.

For maximum braking, each of the four valves 63–66 is closed and as a result the four control chambers 32–35 are vented. The highest braking stage $ST_{16}$ as the rapid braking stage can thus be designated as follows:

$$P_{ST} \text{ Max} = \frac{F_{ax}}{A_o}$$

The next to the last braking stage which is partially within the upper limit of the designated control range R is designated by the relationship $$P_{ST_{15}} = \frac{F_{ax}}{A_o + A_1}$$

The following table illustrates the connection of valves 63-66 for setting of the successive brake stages $ST_1$ to $ST_{16}$ wherein the symbol — indicates a venting of a chamber (the control valve is closed) and the symbol + indicates supplying of air into a chamber. (The respective control valve is open).

TABLE 1

| Braking Stage ST | Radial surfaces of the stepped piston | | | | |
|---|---|---|---|---|---|
| | 14 | 15 | 16 | 17 | 18 |
| 1 | + | + | + | + | + |
| 2 | − | + | + | + | + |
| 3 | + | − | + | + | + |
| 4 | − | − | + | + | + |
| 5 | + | + | − | + | + |
| 6 | − | + | − | + | + |
| 7 | + | − | − | + | + |
| 8 | − | − | − | + | + |
| 9 | + | + | + | − | + |
| 10 | − | + | + | − | + |
| 11 | + | − | + | − | + |
| 12 | − | − | + | − | + |
| 13 | + | + | − | − | + |
| 14 | − | + | − | − | + |
| 15 | + | − | − | − | + |
| 16 | − | − | − | − | + |

Figure 3:
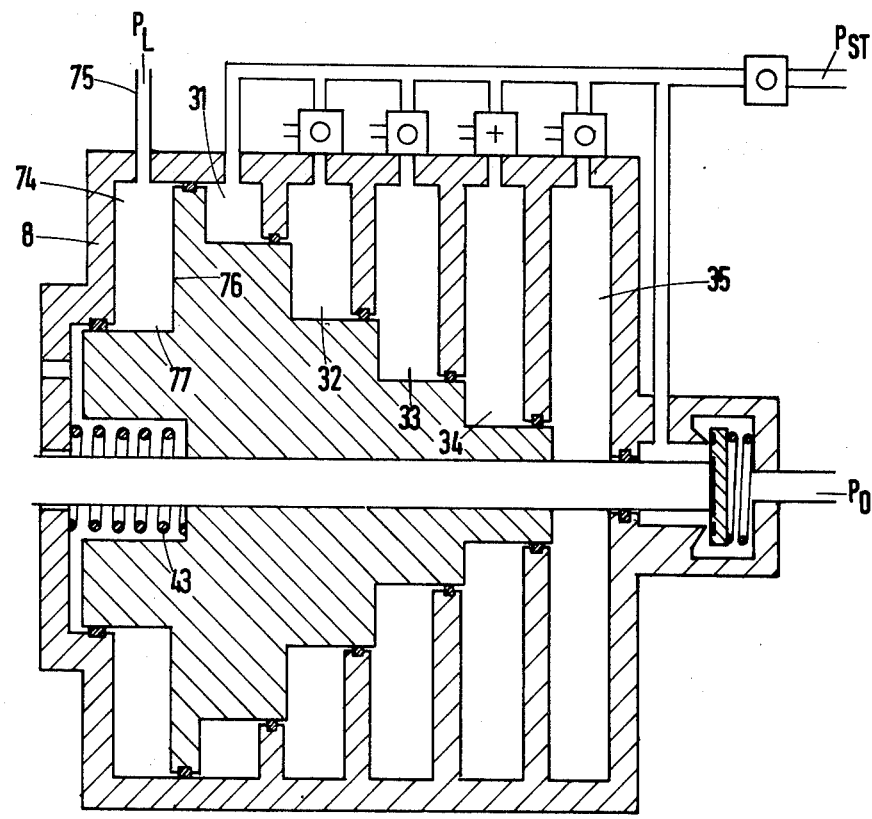
FIG. 3 is a view similar to that of FIG. 1 but showing a modification thereof.

In FIG. 3 there is shown a modification which differs from the embodiment of FIG. 1 in that on the end of the piston away from the stepped surfaces there is provided an additional chamber 74 communicating through a pipe connection 75 to a control pressure $P_L$ which is dependent or responsive to the load of the vehicle. The chamber 74 is defined by an annular radial surface 76 having a surface area $A_2$, a cylindrical surface 77 on the piston 6 and the inner walls of the housing 8. The chamber 74 is adjacent to chamber 31' which corresponds to chamber 31 of the valve of FIG. 1.

The constant axial force $F_{ax}$ which is exerted against the piston can thus be responsive to the load on the vehicle by subjecting the chamber 74 to a load-responsive pressure $P_L$. As a result, the step pressure $P_{ST}$ which is effective at any specific time is always load-responsive and for a particular step $n =$ integer $0 \ldots 15$ and for a certain load-dependent control pressure $P_L$ may be designated as follows:

$$P_{ST}(n, pL) = \frac{F_{spring} + P_L \cdot A_2}{A_o \cdot n \cdot A_1}$$

The constant axial force $F_{ax}$ applied to the piston, which in the embodiment of FIG. 1 is derived merely through the spring 43, is replaced in the modification of FIG. 3 by a load-dependent piston force which may be described as $F_{spring} + P_L \cdot A_2$. It may be advantageous that the force components $F_F$ of spring 43 and of the expression $P_L - A_2$ may have the same ratio as the ratio of the suspension supported and unsupported loads on the vehicle. For example, if $P_L$ represents the pressure of an air bellows supporting the vehicle, the unsupported vehicle weight (althought not included in the control pressure $P_L$) also exerts an effect on the step ratio $P_{ST}$ in a physically more accurate manner when load responsive braking occurs.

Figure 4:
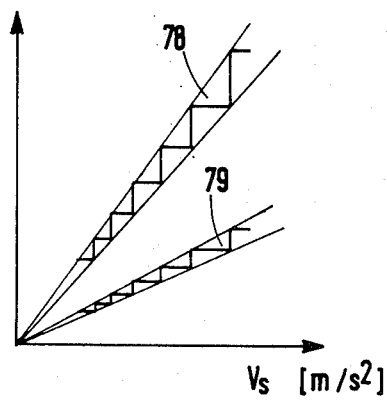
FIG. 4 is a graph which is explanatory of the operation of the modification of FIG. 3.

In FIG. 4, the stage pressure $P_{ST}$ is illustrated as a function of the required deceleration $V_s$. It is apparent from FIG. 4 that the slope of the step curve can be regulated as a function of the value of the control pressure $P_L$. A step curve 78 or a higher control pressure $P_L$ corresponding to a greater load on the vehicle is steeper than a step curve 79 for a lower control pressure $P_L$ corresponding to a smaller vehicle load.

The control valves of FIGS. 1 and 3 can be further simplified structurally if a rapid braking stage is not required. In this case, annular chamber 31 would be omitted and annular chamber 32 comprising radial surface 17 would be subjected continuously to pressure in order to form the large pressure step and thus to eliminate the need for control valve 63. It is apparent that the number of braking or pressure stages which can thus be obtained is correspondingly reduced with this modification.

Figure 5:
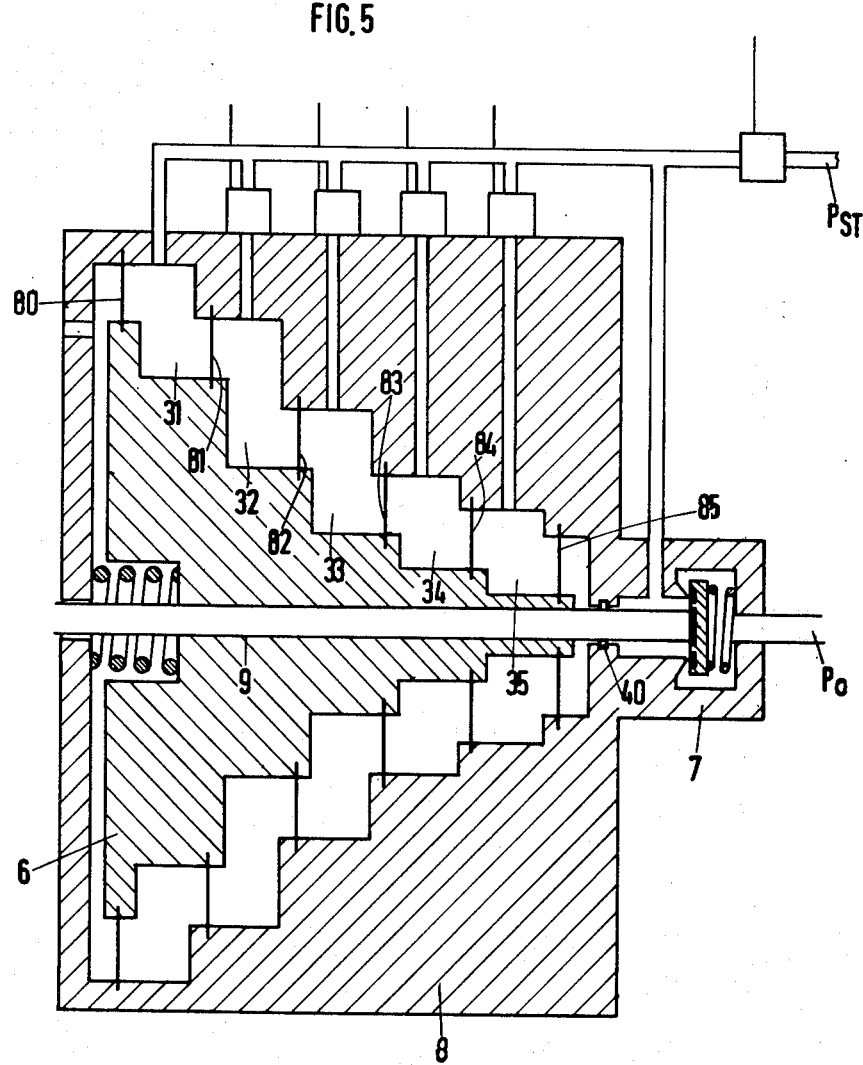
FIG. 5 is a view similar to that of FIG. 1 and showing a second modification thereof.

In the modification of FIG. 5, the control valve of FIG. 1 is modified by replacing the packings 36–39 and 42 by diaphragms 80–85. A further difference from the previous embodiments is that the inner wall of the housing 8a is stepped in the same manner as the stepped piston 6 in order that the chambers 31–35 are divided by diaphragms and still correpond to the corresponding chambers of FIGS. 1 and 3. As a result, only one sliding packing 40 is still provided between the piston pipe 9 and the opening in the end wall of housing 8a which is adjacent to the double valve 7. This reduces the friction of the stepped piston in the housing and significantly increases the sensitivity of the valve device.

It is therefore apparent that the control valve of the present invention has many significant advantages and improvements over similar known valve devices. Such advantages can be summarized as follows:

1. By increasing the pressure level at each step by the step pressure $P_{ST}$ there is obtained a very fine graduation of braking force in the case of smaller deceleration or braking requirements and a relatively rough or course graduation of braking force in the range of higher required deceleration. The result is an efficient utilization of the tolerance range as illustrated in FIG. 2.

2. A relatively large introductory braking stage can be realized in a very simple manner.

3. The load-responsive control pressure permits changing of the braking stage pressure in a simple stepless manner.

4. The fail-safe principle is guaranteed for any braking stage since the failure of digital control lines will bring about a venting of the control chambers to increase the step pressure $P_{ST}$.

5. In contrast to previously known devices, the supply pressure $P_o$ from the reservoir need not be regulated.

6. Each deceleration requirement can be firmly associated with a braking stage.

7. The sensitivity and speed of establishing a braking stage of the present valve device is relatively high even though the structure of the valve device is simple.

It will be understood that this invention is susceptible to modification in order to adapt it to different usages and conditions, and accordingly, it is desired to comprehend such modifications within this invention as may fall within the scope of appended claims.

What is claimed is:

1. A control valve for pressure medium actuated brakes for a railway or other vehicle and comprising a multi-stage axially displaceable stepped piston valve member having a plurality of annular radial surfaces thereon with a predetermined surface area ratio to one another, a double valve connected between a supply of pressure medium, a vent and a brake and operable by said piston valve member so that the pressure medium at the brake is controlled in response to the position of said double valve, a plurality of control valves selectively operable to subject said radial surfaces individually or in combination to said pressure medium at the brake in response to a selected pressure stage, and thereby exerting an axial force upon said piston valve member directed to open said vent via said double valve, and spring means acting upon said piston valve member for applying an axial force against said piston valve member independently of the pressure medium at the brake and in opposition to the force exerted by the pressure medium against said radial surfaces and directed to open a connection from said supply of pressure medium via said double valve to said pressure medium at the brake, such that said applied force and the force by said pressure medium are constant and balance each other at all stages of braking, said piston valve member has a radial surface opposed to said plurality of radial surfaces and said axial force applying means acts upon said opposed radial surface.

2. A control valve as claimed in claim 1 wherein said axial force applying means comprises a fluid pressure cylinder.

3. A control valve as claimed in claim 1 wherein said axial force applying means is adjustable.

4. A control valve as claimed in claim 1 wherein the force applied by said axial force applying means is proportional to the load on the vehicle.

5. A control valve as claimed in claim 1 and means for applying a control force to said opposed radial surface.

* * * * *